March 28, 1950    J. R. FLOYD, JR    2,502,039
VERNIER ATTACHMENT
Filed July 22, 1946
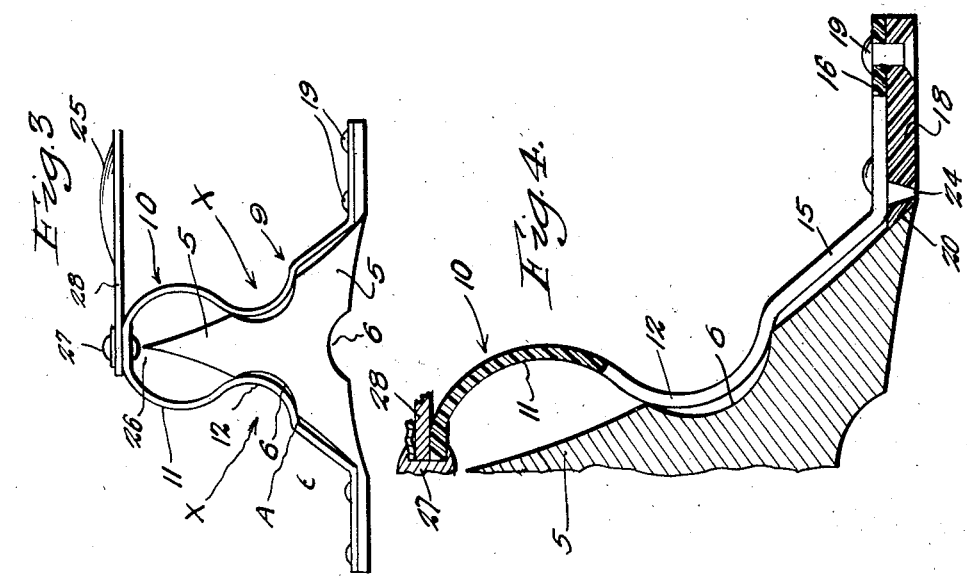
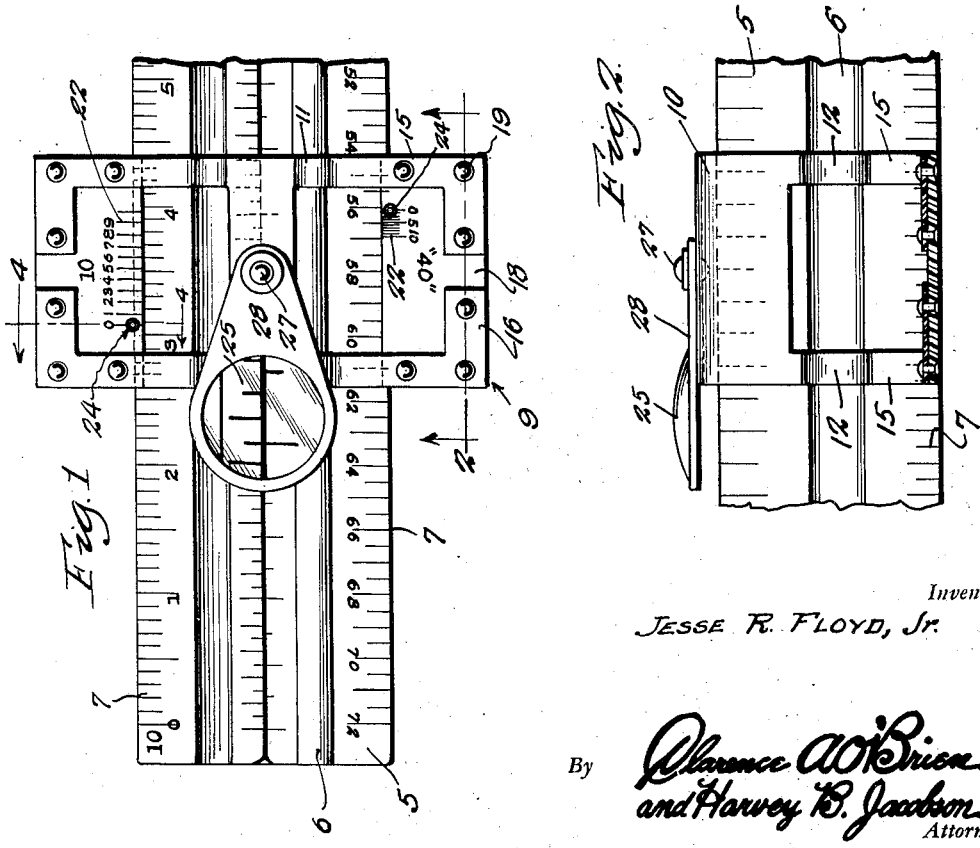
Inventor
JESSE R. FLOYD, Jr.
By Clarence A. O'Brien
and Harvey B. Jacobson
Attorneys Patented Mar. 28, 1950

2,502,039

UNITED STATES PATENT OFFICE 2,502,039

VERNIER ATTACHMENT

Jesse R. Floyd, Jr., Houston, Tex.

Application July 22, 1946, Serial No. 685,338

4 Claims. (Cl. 33—107)

This invention relates to an attachment for rulers and scales and in particular for triangular scales and it has for its main object to provide a vernier attachment capable of being applied or detached for permanent or temporary use and adapted to cooperate with any one of the various scales of the triangular ruler or scale.

It is a well known fact that a vernier is a material help when making measurements as it allows to measure small fractions of a unit with great precision without eyestrain. Such verniers have, as a rule, been applied to the reading scales of measuring instruments but they have not been applied to drawing and plotting aids and especially to the triangular scales most commonly used for measuring purposes. The great advantages of the use of verniers in connection with drawing aids is, however, obvious as a very great precision is frequently required, which cannot be attained without eyestrain and has to be replaced by an estimate of fractions which is not always reliable.

The invention, therefore, provides means which are easily attachable to and detachable from triangular scales and which supply a shiftable vernier scale adapted to be adjusted along each of the individual scales of the triangular scale instrument. The vernier is applied in such a way that it lies flat on the drawing surface and is in direct registry with the scale on which a reading takes place. This provides, therefore, the highest degree of accuracy obtainable.

To these advantages the further advantage has to be added that the vernier scale carrier is easily detachable and attachable so that it can cooperate with any one of the scales, by simply detaching and attaching it in the proper way. Moreover, the same attachment may be used for a plurality of triangular scales, if necessary, and it may remain permanently attached to a scale as it will not interfere with the activity of the user of the scale and will not obstruct much needed space. It may, moreover, be provided with a magnifying lens which gives the greatest possible reading accuracy.

The invention will be more thoroughly understood when referring to the detailed specification and to the drawing illustrating a modification thereof.

One embodiment of the invention is shown in the drawing but it is to be understood that this specific embodiment is to be regarded as an example provided in order to effectively illustrate and explain the principles on which the invention is based and their application to the expert skilled in this art. This explanation provides information sufficient for the construction of other embodiments and such other embodiments are, therefore, not to be regarded as a departure from but as part of the invention.

In the drawings:

Figure 1 is a plan view of a part of a triangular engineer's scale with the vernier attachment according to the invention clamped to it.

Figure 2 is an elevational view of part of the scale shown in Figure 1 and of the vernier attachment, partly in section, the section being taken along line 2—2 of Figure 1.

Figure 3 is an elevational side view of the scale and of the vernier and magnifier attachment.

Figure 4 is a sectional elevational view on an enlarged scale of part of the scale and part of the vernier attachment, the section being taken along line 4—4 of Figure 1.

The usual scale such as used by engineers, draftsmen, cartographers, surveyors and for similar purposes consists of a triangular prismatic body 5 provided with grooves 6 on each side face of the prism in order to facilitate the manipulation. The triangular prismatic shape, is, as a rule, selected in order to be able to apply six scales 7, along the edges. It is sometimes necessary to measure, draft or plot with a high degree of accuracy and to subdivide the smallest unit according to the decimal system. Some of the work has also to be done entirely on a decimal basis. In such cases, as well known, a vernier is most useful, whose scale has to be made up in accordance with the scale in use.

To permit the use of a vernier in connection with triangular prismatic scales the attachment generally indicated at 9 is used. It consists of a slidable clamping frame 10 which may be made of any suitable material capable of exercising a certain amount of elastic pressure. Preferably the frame is made of a transparent plastic in order to interfere as little as possible with the reading of the scale.

Said clamping frame 10 consists of an upper arcuate clamping member 11 provided with inwardly bent clamping jaws 12 of semi-cylindrical shape on each side. These jaws, as clearly shown in Figure 4, fit into the grooves 6 and serve to seat the attachment securely on the triangular scale, while permitting shifting, the elastic tension of the arcuate section 11 pressing the jaws 12 into the grooves 6 of the scale with sufficient tension to secure a good and firm seat in any position to which the member may be shifted.

In the example shown the clamping member 11 is provided with two jaws 12 on each side and said jaws are joined to a foot member 15 which reaches downwardly and carries a projecting flange 16 at a convenient angle thereto. The foot member 15 runs approximately along the inclined side face of the triangular scale, and is then bent so as to project outwardly and it carries a flange 16 bent so as to be in substantial parallelism with the drawing surface on which the scale rests. The flanges 16, 16a on one side of the attachment device project toward each other and form a supporting frame on which the vernier plate 18 is fixed by means of pins or rivets 19 or by other means, such as an adhesive.

The vernier plate 18 may consist of plastics, Celluloid or the like and it carries a clearly distinguishable scale 22 which is applied against the edge of the main scale.

As shown in Figure 4 the scale plate is preferably bevelled as at 20 in order to lie flat on the edge of the scale and the clamping member is so adjusted that the flanges holding the vernier plate have a certain tendency to move downwardly so that the vernier plate 18 is held flat against the drawing surface under some pressure. This pressure causes the bevelled edge of the vernier scale to register exactly with the scale 7 on the edge against which the vernier is applied.

The vernier plate is provided with a small conical plotting hole 24 astride the zero mark of the vernier scale 22 through which a plotting needle or a pencil point may pass, so as to mark the point formed by applying the vernier on the drawing surface or so as to permit alignment of points for scaling. The plotting hole should preferably, as shown in Figure 4, be so disposed that the needle or pencil point passing through it will mark a point located along the edge of the triangular scale.

The vernier attachment may carry a single or a double vernier scale. Where a single vernier scale is to be used the clamping member may be cut on one side approximately near the point marked A on Figure 3 so that the attachment carries only a vernier scale on one side. Where a double arrangement is used, as shown in the figures, pairs of verniers for the various scales of the triangular scale (such as the 10-40; 20-60; 30-50 scales) may be used.

The attachment may be provided with a magnifying glass 25 which is best mounted on a rotatable arm 28 on uppermost point 26 of the arcuate member 11. If necessary, the top part of this member may be flattened for this purpose. The arm 28 may be held on the member 11 by a rivet 27 and a resilient or spring washer 29 may be used in order to hold the glass firmly in the idle position (Figures 1 and 2) or in the operative position (Figure 3).

The magnifying glass may be turned in both directions, where double vernier scales are used, and it is so held and focused that it covers all the vernier scales on the vernier plate. The operation of the vernier attachment will be obvious to the expert skilled in this art and need not be specially described.

It will moreover be obvious to the expert skilled in this art that the details of the attachment may be changed in various ways without departing from the principle or essence of the construction.

I claim:

1. An attachment for triangular scale rules used on drawing surfaces, with faces provided with grooves, one of said faces resting on the drawing surface, while the other faces are inclined thereto, said attachment comprising a slide consisting of a clamping member provided with two pairs of clamping jaws, spaced from each other, each pair of jaws adapted to engage the grooves on two contiguous faces of the triangular scale rule which are inclined toward the drawing surface, a foot member projecting from a pair of clamping members, having a section extending along the face of the triangular scale rule towards the drawing surface and a section projecting outwardly, said outwardly directed projection being in substantial parallelism with the drawing surface, a vernier plate resting on the drawing surface and projecting from the scale rule outwardly, said vernier plate being held by the outwardly projecting section of the foot member.

2. An attachment for triangular scale rules used on drawing surfaces with faces provided with grooves, one of said faces resting on the drawing surface, while the other faces are inclined thereto, said attachment comprising a slide member astride two contiguous faces of the scale rule and adapted to slide longitudinally along said scale rule, said slide member having an arcuate clamping section for producing an elastic tension, two pairs of spaced clamping jaws projecting therefrom, each pair being pressed into and engaging the grooves on two contiguous faces of the scale rule, foot members projecting from the spaced clamping jaws on the same side of the arcuate clamping section, said foot members having a section extending along the faces of the triangular scale rule and a further section projecting outwardly and substantially parallel to the drawing surface, flanges held by and projecting from said foot members arranged in substantial parallelism to the longitudinal edges of the scale rule and in parallelism to the drawing surface, and a vernier plate provided with a vernier scale attached to said flanges and foot member projections and held along the edge of the triangular scale rule with its inner side in close proximity to the longitudinal edge of the scale rule and with its underside substantially in the drawing surface.

3. An attachment for triangular scale rules used on drawing surfaces with faces provided with grooves, one of said faces resting on the drawing surface, while the other faces are inclined thereto, said attachment comprising a slide member astride two contiguous faces of the scale rule and adapted to slide longitudinally along said rule, said slide member having an arcuate clamping section for producing an elastic tension, two pairs of spaced clamping jaws projecting from said arcuate clamping section, each pair being pressed into and engaging the grooves on two contiguous faces of the scale rule, foot members projecting from both pairs of clamping members on each side, each foot member having a section extending along a face of the triangular scale rule towards the drawing surface and a section projecting outwardly, said outwardly projecting section being in substantial parallelism with the drawing surface, flanges projecting from the said outwardly projecting sections of the foot members, the flanges on one side of the scale rule being turned toward each other, forming a frame, said frame being in substantial parallelism with the drawing surface, and two vernier plates provided with different vernier scales on the inner side of the plates attached to the frames on the two sides of the slide respectively, said vernier plates having their undersides resting on the drawing surface and their inner sides in sliding contact with one longitudinal edge of the scale rule.

4. An attachment for triangular scales of the character described and specified in claim 2, wherein the vernier plate is bevelled along the edge which is in contact with one of the edges of the triangular scales.

JESSE R. FLOYD, Jr.

REFERENCES CITED

The following references are of record in the file of this patent:

UNITED STATES PATENTS

| Number | Name | Date |
| --- | --- | --- |
| 1,809,058 | Minner et al. | June 9, 1931 |
| 1,888,305 | Berger | Nov. 22, 1932 |
| 2,355,161 | Holstein | Aug. 8, 1944 |